July 31, 1934.    J. J. BERG    1,968,513
FERTILIZER DISTRIBUTOR
Filed June 29, 1931

INVENTOR.
JOHN J. BERG
BY
ATTORNEY.

Patented July 31, 1934

1,968,513

UNITED STATES PATENT OFFICE 1,968,513

FERTILIZER DISTRIBUTOR

John J. Berg, Cecil, Wis., assignor of one-half to Russell E. Williams, Green Valley, Wis.

Application June 29, 1931, Serial No. 547,746

1 Claim. (Cl. 221—126)

The invention relates to an agriculture machine, and more especially to a fertilizer distributor.

The primary object of the invention is the provision of a machine of this character, wherein the construction thereof is such that the fertilizer material will be evenly and positively distributed as the hopper for such material is novel in form and said material is constantly removed from one side of the hopper so that the material will not arch or cake interiorly of the said hopper during the work of the machine.

Another object of the invention is the provision of a machine of this character, wherein the distributor bars within the hopper are driven from one traction wheel of such machine, so that these bars will be constantly moved to operate on the material within the hopper and thus preventing the caking of the material or the clogging of the machine when working.

A further object of the invention is the provision of a machine of this character, wherein the construction thereof is novel in form to assure a positive and even flow of the material from the hopper therefor and in this manner a uniform distribution of the said material is had in the operation of the machine.

A still further object of the invention is the provision of a machine of this character, which is extremely simple in construction, thoroughly reliable and efficient in operation, strong, durable, automatic in action, and inexpensive to manufacture.

With these and other objects in view the invention consists in the features of construction, combination and arrangement of parts as will be hereinafter more fully described, illustrated in the accompanying drawing which discloses the preferred embodiment of the invention, and pointed out in the claim hereunto appended.

In the accompanying drawing.

Similar reference characters indicate corresponding parts throughout the several views in the drawing.

Figure 1:
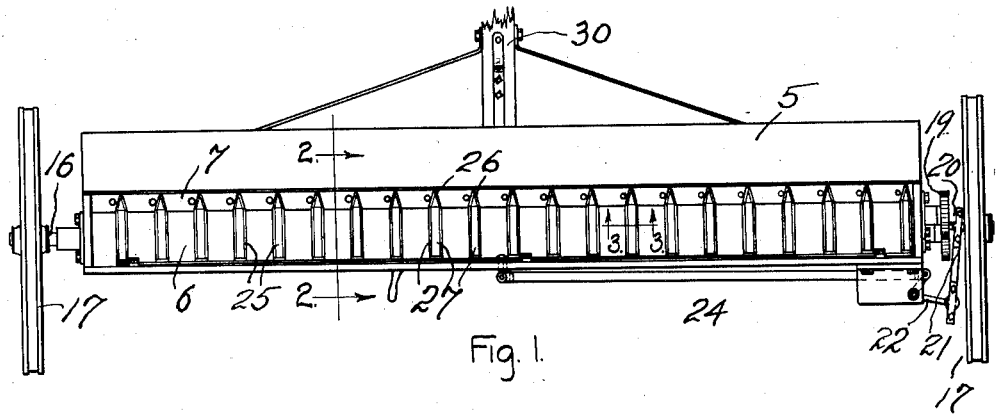
Figure 1 is a fragmentary top plan view of the machine constructed in accordance with the invention showing the top or cover to the hopper opened.
Figure 2:
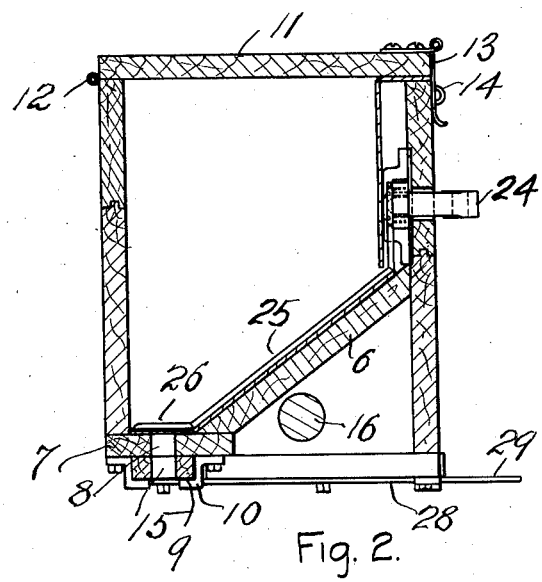
Figure 2 is an enlarged sectional view taken on the line 2—2 of Figure 1 looking in the direction of the arrows.
Figure 3:
Figure 3 is an enlarged sectional view taken transversely through one of the scraper bars for the hopper of the machine.

Referring to the drawing in detail the machine comprises a box like hopper 5, preferably made from wood, although it may be made from any other suitable material accordingly to the fancy of the manufacturer, and this hopper is provided with an inclined bottom section 6, the latter meeting a horizontally disposed relatively narrow bottom proper 7 which is formed with a row of spaced discharge holes or openings 8, for the discharge of material from the said hopper.

Immediately beneath this bottom proper 7 is a discharge control slide 9, the latter being supported in guide cleats 10, suitably secured to the under side of said bottom proper 7.

At the top of the hopper 5 is a cover or top 11, which is connected thereto through the medium of hinges 12, and such cover or top 11 is held closed by a swinging hasp 13 engaging a keeper 14 of the ordinary well known construction.

The slide 9 is provided with holes or openings 15 these being adapted to be brought into and out of register with the holes or openings 8 in the bottom proper 7, for regulating the discharge of material when placed within the hopper 5 for distribution in the working of the machine.

Supported within the hopper 5 beneath the bottom section 6 and mounted in bearings outside of the hopper and on the ends thereof is a horizontal shaft 16 which has thereon the usual ground or traction wheels 17. One of the wheels 17 carries at its hub a gear 18 which meshes with a pinion 19 having eccentric connection with a toggle 20, the latter being operatively associated with the lever 21, which through the pitman 22, connected at 23 operates a reciprocating actuator bar 24 carrying a series of spaced scrapers 25, these conforming to the inclined bottom section 6 and having the tapered pointed feeder tips 26 confronting the upper side of the bottom proper 7 to work toward and away from the holes or openings 8 therein to cause the free discharge of the material from the hopper.

Each scraper 25 is formed with opposite beveled edges 27 to present double knife edges which serve to prevent the caking of the material within the hopper and also avoid arching of such material with the result that the material will be kept broken up in powder form so it will flow freely through the discharge holes or openings in the hopper, as well as working the material down inclined bottom section 6 of said hopper.

The bars 24 act as agitators, scrapers and feeders in the working of the machine.

The slide 9, which is beneath the bottom 7 has connected therewith a control lever 28 which extends beyond the hopper and terminates in a handle 29 for the manual manipulation thereof by the operator of the machine.

Projecting forwardly of the hopper is tongue 30 for the hitching of draft horses to the machine in the usual well known manner.

What is claimed is:

A fertilizer distributor of the kind described, comprising a box-like hopper having an inclined major bottom and a horizontal flat minor bottom, respectively, said minor bottom being provided with a row of spaced holes, a discharge control slide beneath this minor bottom and having holes co-acting with the first named holes for regulating the discharge of material from the hopper, a shaft rearwardly of the inclined major bottom and journaled exteriorly of the hopper, blade-like scrapers conforming to the major and minor bottoms and slidable thereon, an actuator bar fitted with the hopper and carrying the scrapers, pointed tips on the scrapers for confronting the holes in said minor bottom, each scraper having opposed beveled edges presenting double knifed portions, and connections between the actuator bar and shaft for operating the scrapers.

JOHN J. BERG.